(12) United States Patent
Tanaka et al.

(10) Patent No.: US 10,099,593 B2
(45) Date of Patent: Oct. 16, 2018

(54) ARCUATELY ADJUSTABLE FOOTREST

(71) Applicant: GM GLOBAL TECHNOLOGY OPERATIONS LLC, Detroit, MI (US)

(72) Inventors: Denis Y. Tanaka, Sao Caetano do Sul (BR); Tania A. Damico, Sao Bernardo do Campo (BR)

( * ) Notice: Subject to any disclaimer, the term of this patent is extended or adjusted under 35 U.S.C. 154(b) by 89 days.

(21) Appl. No.: 15/419,118

(22) Filed: Jan. 30, 2017

(65) Prior Publication Data

US 2018/0215300 A1 Aug. 2, 2018

(51) Int. Cl.
*B60N 3/06* (2006.01)
*B62D 65/02* (2006.01)

(52) U.S. Cl.
CPC ............. *B60N 3/063* (2013.01); *B62D 65/02* (2013.01)

(58) Field of Classification Search
CPC ......... B60N 3/063; B60N 99/00; B62D 65/02
USPC ..................................... 296/191, 193.07, 75
See application file for complete search history.

(56) References Cited

U.S. PATENT DOCUMENTS

| | | | |
|---|---|---|---|
| 6,241,301 B1 * | 6/2001 | Speth .................. | B60N 2/0232 180/90.6 |
| 6,318,785 B1 * | 11/2001 | Tousignant ........... | B60N 2/0228 296/75 |
| 2003/0084744 A1 * | 5/2003 | Parenteau ............ | G05G 1/405 74/512 |
| 2008/0143137 A1 * | 6/2008 | Bowen ................. | B60N 2/0232 296/75 |
| 2011/0233967 A1 * | 9/2011 | Ohtsubo ............... | B60N 2/067 296/193.07 |
| 2014/0035341 A1 * | 2/2014 | Bohmer ................ | B60N 3/063 297/423.1 |

* cited by examiner

*Primary Examiner* — Jason S Morrow
*Assistant Examiner* — E Turner Hicks

(57) ABSTRACT

An adjustable footrest for an occupant of a vehicle is presented herein. An embodiment of the system includes the features of an arcuate base, motor, and footrest. The arcuate base is configured to be installed within a vehicle foot well and includes a groove. The motor is configured to be positioned within the arcuate base and includes a rotatable gear. The footrest itself includes a body, pedal gear and tongue. The body is configured for frontside engagement by a foot. The pedal gear is located on the body backside. The tongue is on the body backside and is configured to operatively interlock into the groove to provide footrest stability. Moreover, the interaction between the rotatable gear and pedal gear move the footrest along the arcuate base during motor operation.

18 Claims, 4 Drawing Sheets

ARCUATELY ADJUSTABLE FOOTREST

INTRODUCTION

Fixed-position footrests are generally not readily adjustable to different angles so as to accommodate vehicle occupants of different sizes and allow them to change foot positions. As a result, these occupants tend to avoid using their footrest during long journeys and end up being uncomfortable due to cramping and tiring in their legs. It would therefore be desirable to have a footrest which could readily be adjusted to different angles to allow for more comfortable vehicle travel.

SUMMARY

An adjustable footrest for an occupant of a vehicle is presented herein. An embodiment of the system includes the features of an arcuate base, motor, and footrest. The arcuate base is configured to be installed within a vehicle foot well and includes a groove. The motor is configured to be operatively connected to the arcuate base and includes a rotatable gear. The footrest itself includes a body, pedal gear, and tongue. The body is configured for frontside engagement by a foot. The pedal gear is located on the body backside. The tongue is on the body backside and is configured to operatively interlock into the groove to provide footrest stability. Moreover, the interaction between the rotatable gear and pedal gear move the footrest along the arcuate base during motor operation.

The adjustable footrest system may further include a user switch configured to control motor operation. The footrest may further include a footpad positioned on the body frontside. The footrest may further include a side panel.

The arcuate base may further include a sidetrack. In such instances, the tongue may include a pin configured to operatively interlock into the sidetrack. In such instances, moreover, the interlocking relationship between the sidetrack and pin is configured to maintain the interlock relationship between the tongue and groove during motor operation. The pedal gear and motor gear may include a series of teeth. Moreover, in these instances, the pedal gear teeth and motor gear teeth are configured to operatively interlock with each other during motor operation.

The footrest may have an angular variation between 20 degrees and 50 degrees during movement from a first position to a second position along the arcuate base. The arcuate base may include a support feature. The adjustable footrest may be configured for engagement by the left foot of a vehicle operator. The vehicle may be an automobile.

A method of assembling an adjustable footrest system for an occupant of a vehicle is also presented herein. The method includes the steps of: providing an arcuate base configured to be installed within a vehicle foot well, the arcuate base having a groove; providing a motor configured to be operatively connected to the arcuate base, the motor having a rotatable gear; providing a footrest (having: a body configured for frontside engagement by a foot; a pedal gear on the body backside; and a tongue on the body backside, the tongue configured to operatively interlock into the groove to provide footrest stability); positioning the motor within the arcuate base; inserting the tongue into the groove in an operatively interlocked manner; connecting the pedal gear to the motor gear; mounting the footrest to the arcuate base in a movable manner; allowing the footrest to move from a first position to a second position along the arcuate base during motor operation. The method may further include the steps of: providing a user switch configured to control motor operation; installing the user switch in the vehicle interior; and enabling control of the motor operation via the user switch.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
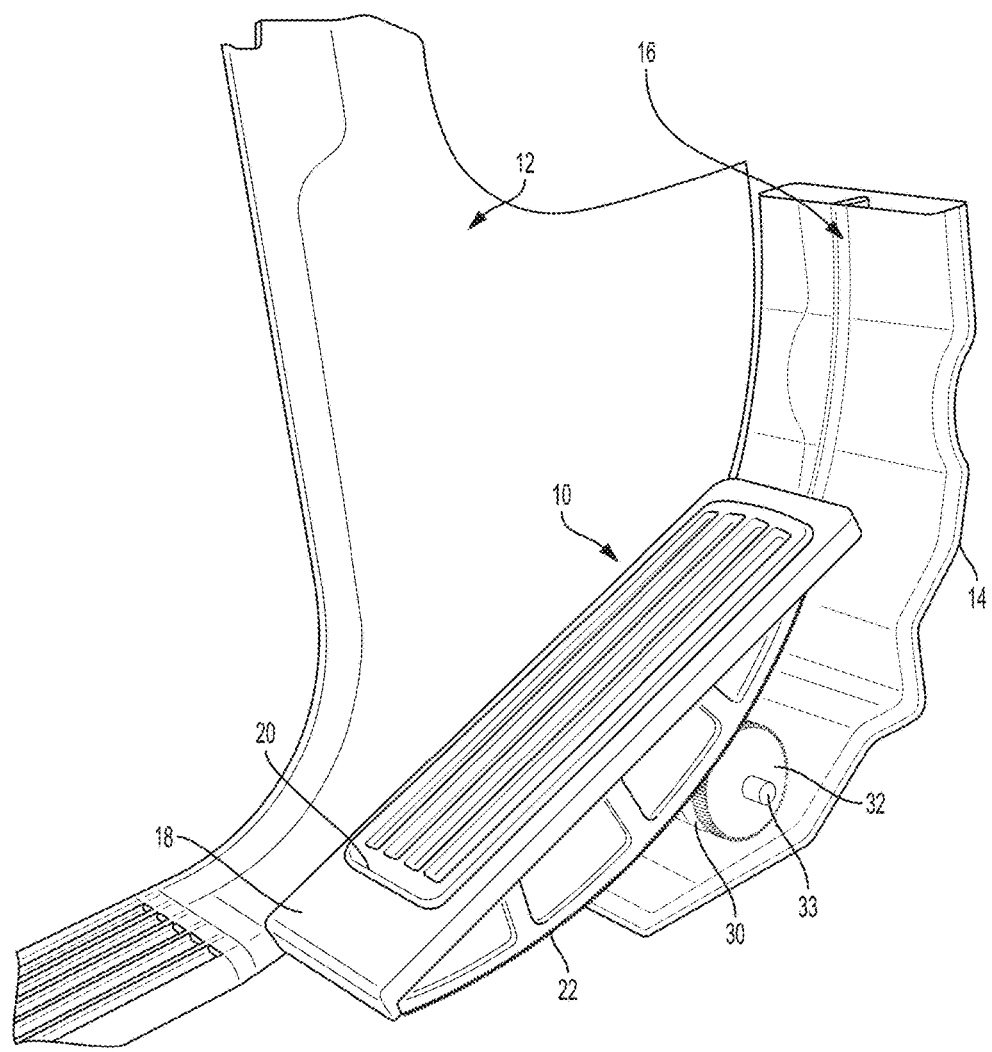
FIG. 1 shows an environment in which an adjustable footrest system may be implemented.
Figure 2:
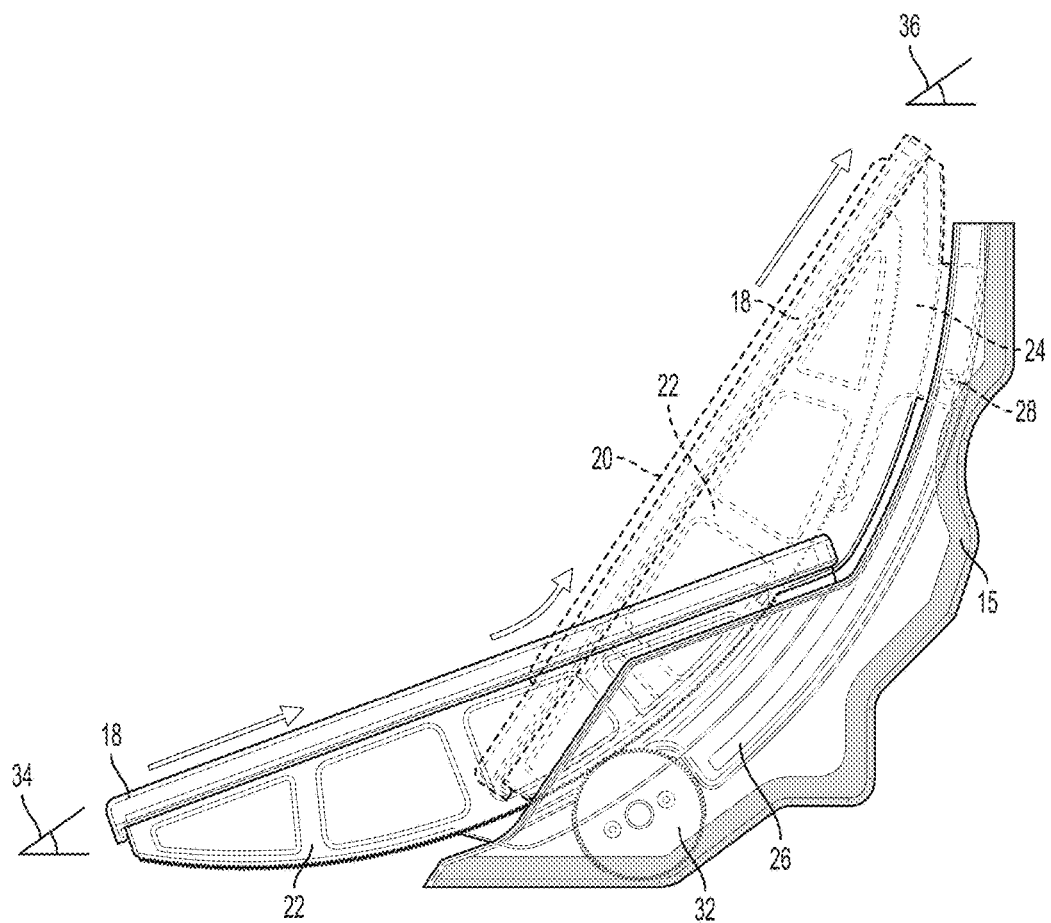
FIG. 2 shows a side view of an aspect of an embodiment of the adjustable footrest system.
Figure 3:
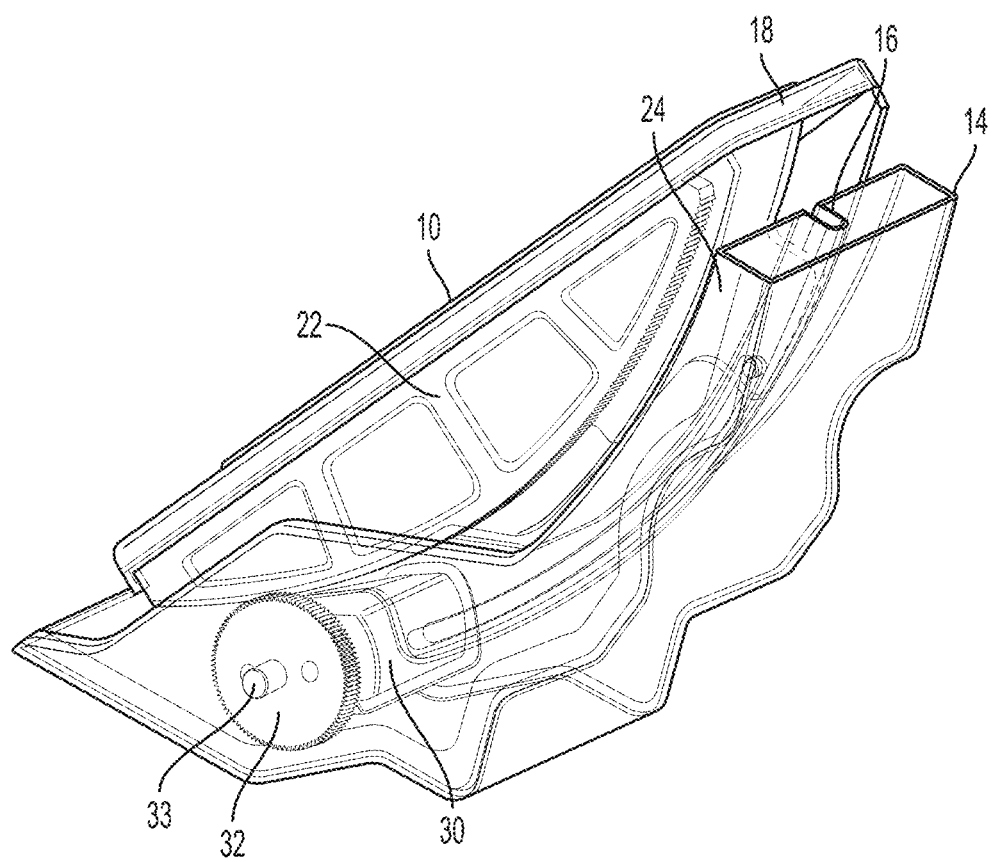
FIG. 3 shows a back perspective view of another aspect of the adjustable footrest system of FIG. 2.

With reference to FIGS. 1 through 3, an embodiment of the adjustable footrest 10 can be seen to extend at an angular orientation in the foot well 12 of an automobile. As shown, footrest 10 is located on the left side of foot well 12, which will allow the operator (i.e., driver) to engage their left foot (not shown) upon footrest 10 for comfort purposes. It has been envisioned that footrest 10 may be located in vehicles other than automobiles, such as, but not limited to, trucks, sports utility vehicles (SUVs), recreational vehicles (RVs), marine vessels (e.g., boats) and aircraft. It should also be understood that footrest 10 may be located in a vehicle's passenger foot well (not shown) to allow a passenger to engage either foot (depending upon the side of the foot well 14 in which footrest 10 is located).

Footrest 10 is positioned on an arcuately-shaped base 14 with a centrally located groove 16 spanning from one end of base 14 to the other. In addition, an internal support structure 15 may span the length of the base's internal backside to ensure the weight of the combined footrest 10 and foot do not significantly deform the arcuate shape of base 14. Footrest 10 itself incorporates an elongated rectangular body 18 which is exposed on a frontside that is for engagement by the operator's foot (not shown). An elastomeric (e.g., rubber) or polymeric (e.g., vinyl) footpad 20 may be joined to the frontside of body 18, or footpad 20 may be engraved onto body 18, so as to provide traction for the resting foot of the operator.

The backside of body 18 includes a bow-shaped pedal gear 22 that has a series of rigid gear teeth spanning from one gear end to the other. A bow-shaped and centrally located tongue 24 is also included on the backside of body 18. Upon installation of footrest 10 onto base 14, tongue 24 is slidably interlocked into groove 16 to allow for defined back-forth movement of footrest 10 along base 14. This interlocking relationship also provides for stability of installed footrest 10. A sidetrack 26 which is an elongated orifice is located on the side of groove 16. A pin 28 which generally protrudes from one side of tongue 24 is interlocked into sidetrack 26. This relationship between sidetrack 26 and pin 28 ensures footrest 10 does not become uninstalled from base 14 and nor does tongue 24 become dislodged from groove 16. A side panel is additionally included on the backside of body 18 to obstruct occupant view of the pedal gear and tongue of the installed footrest 10. Skilled artisans will see the footrest 10, pedal gear 22, tongue 24, and body 18 may be constructed from materials such as, but not limited to, metallic material (e.g., sheet metal), polymeric material, elastomeric material, or some combination thereof.

Towards the bottom portion of base 14, an electric motor 30 with circular gear 32 is functionally installed into a portion of base 14 to generate the back-forth positioning of footrest 10. Motor gear 32 is moreover connected to the rotor/drive axis 33 of motor 30 and includes a series of rigid gear teeth along the gear sides. Motor 30 is wired (not shown) to the vehicle circuitry (not shown) through foot well 12. As such, when motor 30 is in operation, interaction between the teeth of the rotating motor gear 32 and pedal gear 22 moves the footrest 10 forwards and backwards along base 14. This movement thus follows the curved, arcuate path defined by the functional side of base 14. As a result, footrest 10 may additionally have an angular variation of 30 degrees. For example, footrest 10 may start at a first position 34 that causes body 18 to be at an operational axis of 20 degrees and be moved to a second position 36 that causes body 18 to pivot to an axis of 50 degrees.

Figure 4:
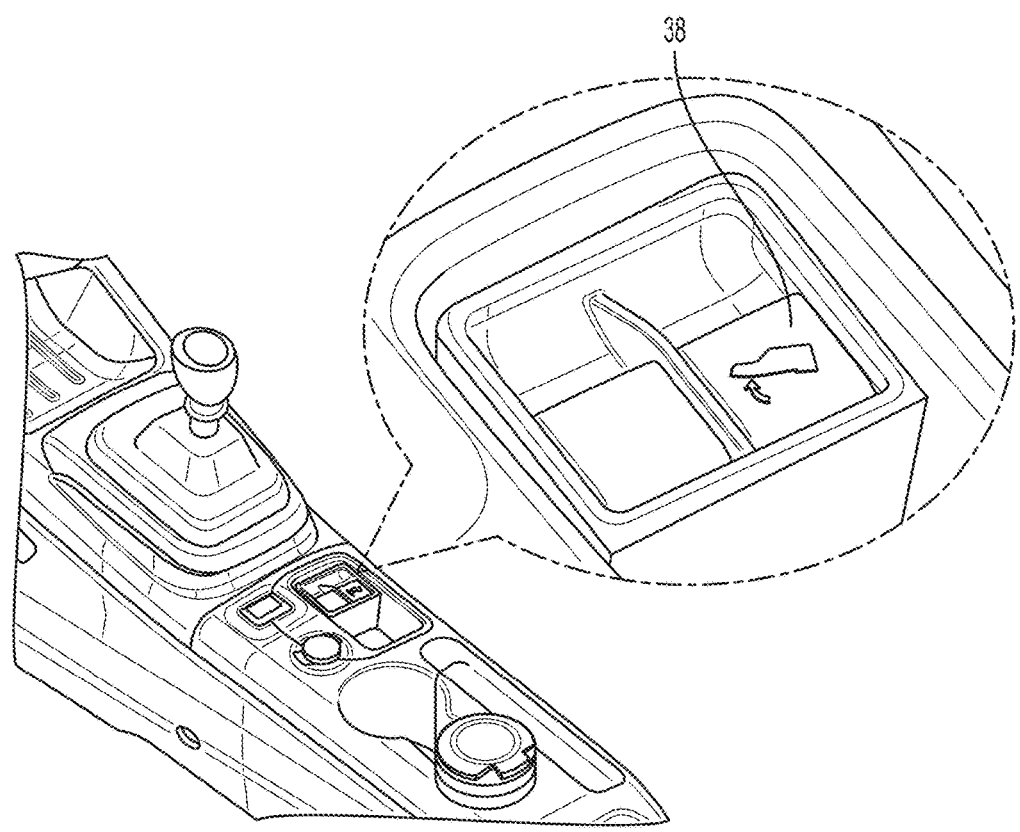
FIG. 4 shows a control aspect of an adjustable footrest system embodiment.

As shown in FIG. 4, the motor 30 may be communicatively connected to a user switch 38 located within the vehicle interior (i.e., via wiring). The user switch 38 may allow the vehicle operator to angularly adjust footpad 10 via at least the methodology discussed above. It should be understood that the wiring connecting the user switch 38 may be connected to any one of the Vehicle System Modules (VSMs), no shown, such as the vehicle's Body Control Module (BCM), to assist in the user switch 38 control of footpad 10.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An adjustable footrest system for an occupant of a vehicle, the footrest system comprising:
    a base having an arcuate shape, the arcuately-shaped base configured to be installed within a vehicle foot well, the arcuately-shaped base comprising a centrally located groove spanning from one end of the base to the other end of the base;
    a motor configured to be operatively connected to the arcuately-shaped base, the motor comprising a rotatable gear;
    a footrest comprising:
        a body configured for frontside engagement by a foot;
        a bow-shaped pedal gear on the body backside; and
        a bow-shaped and centrally located tongue on the body backside, the bow-shaped tongue configured to operatively interlock into the groove of the base to provide footrest stability and allow for defined back-forth movement of the footrest; and
    wherein interaction between the rotatable gear and pedal gear move the footrest along the arcuately-shaped base during motor operation.

2. The adjustable footrest system of claim 1, further comprising a user switch configured to control motor operation.

3. The adjustable footrest system of claim 1, wherein the footrest further comprises a footpad positioned on the body frontside.

4. The adjustable footrest system of claim 1, wherein the footrest further comprises a side panel.

5. The adjustable footrest system of claim 1, wherein:
    the arcuately-shaped base further comprises a sidetrack, the sidetrack is an elongated orifice located on the side of the groove;
    the tongue comprises a pin configured to operatively interlock into the sidetrack; and
    wherein the interlocking relationship between the sidetrack and pin is configured to maintain the interlock relationship between the tongue and groove during motor operation.

6. The adjustable footrest system of claim 1, wherein pedal gear and the rotatable gear each comprise a series of teeth, wherein the pedal gear teeth and rotatable gear teeth are configured to operatively interlock with each other during motor operation.

7. The adjustable footrest system of claim 1, wherein the arcuately-shaped base comprises an internal support structure that spans the length of an internal backside of the arcuately-shaped base to protect the arcuately-shaped base from deformation.

8. The adjustable footrest system of claim 1, wherein the adjustable footrest is configured for engagement by the left foot of a vehicle operator.

9. The adjustable footrest system of claim 1, wherein the vehicle is an automobile.

10. An adjustable footrest system for an occupant of a vehicle, the footrest system comprising:
    a base having an arcuate shape, the arcuately-shaped base installed within a vehicle foot well, the arcuately-shaped base comprising a centrally located groove spanning from one end of the base to the other end of the base, a sidetrack being is an elongated orifice located on the side of the groove, and an internal support structure that spans the length of an internal backside of the arcuately-shaped base to protect the arcuately-shaped base from deformation;

a motor installed within a portion of the arcuately-shaped base, the motor comprising a rotatable gear;

a footrest comprising:
  a body configured for frontside engagement by a foot;
  a bow-shaped pedal gear on the body backside; and
  a bow-shaped and centrally located tongue on the body backside, the bow-shaped tongue comprising a pin, the tongue operatively interlocked into the groove of the base to provide footrest stability and allow for defined back-forth movement of the footrest;
    the pin operatively interlocked into the sidetrack to maintain the relationship between the tongue and groove;
  a side panel to obstruct occupant view of the pedal gear and tongue;

a user switch configured to control motor operation;

wherein interaction between the rotatable gear and pedal gear move the footrest along the arcuately-shaped base during motor operation, and wherein the angular variation of the footrest is thirty (30) degrees during movement from a first position to a second position along the arcuately-shaped base.

11. The adjustable footrest system of claim 10, wherein the footrest further comprises a footpad positioned on the body frontside.

12. The adjustable footrest system of claim 10, wherein the pedal gear and the rotatable gear each comprise a series of teeth, wherein the pedal gear teeth and rotatable gear teeth are configured to operatively interlock with each other during motor operation.

13. The adjustable footrest system of claim 10, wherein the adjustable footrest is configured for engagement by the left foot of a vehicle operator.

14. The adjustable footrest system of claim 10, wherein the vehicle is an automobile.

15. A method of assembling an adjustable footrest system for an occupant of a vehicle, the method comprising:
  providing a base having an arcuate shape, the arcuately-shaped base configured to be installed within a vehicle foot well, the arcuately-shaped base comprising a centrally located groove spanning from one end of the base to the other end of the base;
  providing a motor configured to be positioned within the arcuately-shaped base, the motor comprising a rotatable gear;
  providing a footrest comprising:
    a body configured for frontside engagement by a foot,
    a bow-shaped pedal gear on the body backside; and
    a bow-shaped and centrally located tongue on the body backside, the bow-shaped tongue configured to operatively interlock into the groove of the base to provide footrest stability and allow for defined back-forth movement of the footrest;
  connecting the motor to the arcuately-shaped base in an operative manner;
  inserting the bow-shaped tongue into the groove of the base in an operatively interlocked manner;
  connecting the pedal gear to the rotatable gear;
  mounting the footrest onto the arcuately-shaped base in a defined back-forth movable manner;
  allowing the footrest to move from a first position to a second position along the arcuately-shaped base during motor operation.

16. The method of assembling an adjustable footrest system of claim 15, further comprising:
  providing a user switch configured to control motor operation;
  installing the user switch in the vehicle interior, and
  enabling control of the motor operation via the user switch.

17. The method of assembling an adjustable footrest system of claim 15, wherein the footrest further comprises a footpad positioned on the body frontside.

18. The method of assembling an adjustable footrest system of claim 15, wherein:
  the arcuately-shaved base further comprises a sidetrack, the sidetrack is an elongated orifice located on the side of the groove;
  the tongue comprises a pin configured to operatively interlock into the sidetrack; and
  wherein the interlocking relationship between the sidetrack and pin is configured to maintain the interlock relationship between the tongue and groove during motor operation.

* * * * *